(12) United States Patent
Maeno

(10) Patent No.: US 6,954,540 B2
(45) Date of Patent: Oct. 11, 2005

(54) IMAGE TRANSMISSION DEVICE AND STORAGE MEDIUM WITH PROGRAM FOR REALIZING ITS FUNCTION, IMAGE DISPLAY DEVICE AND STORAGE MEDIUM WITH PROGRAM FOR REALIZING ITS FUNCTION, AND IMAGE TRANSMISSION/ RECEPTION SYSTEM

(75) Inventor: Kurato Maeno, Gunma (JP)

(73) Assignee: Oki Electric Industry Co., Ltd., Tokyo (JP)

(*) Notice: Subject to any disclaimer, the term of this patent is extended or adjusted under 35 U.S.C. 154(b) by 621 days.

(21) Appl. No.: 09/881,724

(22) Filed: Jun. 18, 2001

(65) Prior Publication Data

US 2002/0021822 A1 Feb. 21, 2002

(30) Foreign Application Priority Data

Jun. 29, 2000 (JP) ...................................... 2000-195856

(51) Int. Cl.$^7$ ................................................ G06K 9/00
(52) U.S. Cl. ...................... 382/100; 382/137; 382/232; 713/176; 713/194; 380/217
(58) Field of Search ................................ 380/201, 202, 380/217, 45, 239, 281; 382/100, 232, 248, 166, 284, 305, 294, 112, 135, 137, 138, 140, 302; 194/209, 210; 356/71; 705/45; 902/7; 713/176, 194, 200; 710/68; 283/17, 70; 399/366; 348/24–25, 61, 73; 358/3.28, 426.02; 341/50; 493/379

(56) References Cited

U.S. PATENT DOCUMENTS

| 4,261,018 A | * | 4/1981 | Knowlton | 358/470 |
|---|---|---|---|---|
| 4,512,595 A | * | 4/1985 | Breen | 283/70 |
| 5,898,779 A | * | 4/1999 | Squilla et al. | 713/176 |
| 5,940,513 A | * | 8/1999 | Aucsmith et al. | 713/187 |
| 5,983,065 A | * | 11/1999 | Folkins et al. | 399/366 |
| 5,995,638 A | * | 11/1999 | Amidror et al. | 382/100 |
| 6,005,936 A | * | 12/1999 | Shimizu et al. | 713/176 |
| 6,040,825 A | * | 3/2000 | Yamamoto et al. | 345/173 |
| 6,188,997 B1 | * | 2/2001 | Ratzenberger et al. | 705/410 |
| 6,249,588 B1 | * | 6/2001 | Amidror et al. | 382/100 |
| 6,266,680 B1 | * | 7/2001 | Song et al. | 715/500 |
| 6,357,004 B1 | * | 3/2002 | Davis | 713/100 |
| 6,419,618 B1 | * | 7/2002 | Mackinlay et al. | 493/379 |
| RE38,236 E | * | 8/2003 | Kubota et al. | 380/45 |
| 6,633,653 B1 | * | 10/2003 | Hobson et al. | 382/100 |
| 6,728,883 B1 | * | 4/2004 | Kohashi et al. | 713/200 |
| 6,819,775 B2 | * | 11/2004 | Amidror et al. | 382/100 |
| 2002/0012445 A1 | * | 1/2002 | Perry | 382/100 |
| 2003/0011684 A1 | * | 1/2003 | Narayanaswami et al. | 348/207.99 |
| 2004/0022444 A1 | * | 2/2004 | Rhoads | 382/232 |

* cited by examiner

*Primary Examiner*—Bhavesh M. Mehta
*Assistant Examiner*—Barry Choobin
(74) *Attorney, Agent, or Firm*—Rabin & Berdo, P.C.

(57) ABSTRACT

This invention provides an image transmission device and an image display device capable of preventing easily the image data from being tampered with and of confirming the originality of the image data visually. More specifically, this invention provides an image transmission device and an image display device wherein: the image display device receives the coded-image data transmitted from the image transmission device and the encrypted mark coded-image data, and decrypts the mark image by using the hash value of the decoded image; the mark image connected with the image is output; when even a part of the image is tampered with, the coded-image data of the mark image which is decrypted by using the hash value as a key become different from the coded-image data of the mark image which is not tampered with; and consequently, the mark image finally achieved enables to judge visually and easily whether the image data are tampered with or not.

12 Claims, 4 Drawing Sheets

IMAGE TRANSMISSION DEVICE AND STORAGE MEDIUM WITH PROGRAM FOR REALIZING ITS FUNCTION, IMAGE DISPLAY DEVICE AND STORAGE MEDIUM WITH PROGRAM FOR REALIZING ITS FUNCTION, AND IMAGE TRANSMISSION/ RECEPTION SYSTEM

BACKGROUND OF THE INVENTION

1. Field of the Invention

The present invention relates to an image transmission device and a storage medium with a program for realizing its function, an image display device and a storage medium with a program for realizing its function, and image transmission/reception system which are capable of preventing the image data from being tampered with and ensuring the originality.

Recently, more and more companies are taking what is called a paperless measure capturing documents, checks and the like as image data and corresponding the data by using a network system. However, the development of computer pertinent art helps the paperless measure, on the other hand, enables the image data to be easily tampered with.

2. Description of the Related Art

In the conventional paper culture, marks, stamps, signs and the like are used to ensure that the documents and checks are not tampered with, in other words, to ensure the originality. Also, a watermark is used on, for example, bills, gift certificates, official documents or the like to ensure the originality. Considering this point, some kind of measure needs to be taken to ensure the originality of documents and checks in taking the paperless measure mentioned above.

A part of image data can be easily tampered with having no visual evidence by being electronically processed. Consequently, it is difficult to ensure the originality only by putting marks, stamps, signs and the like on a part of the image data as in the conventional paper culture. Therefore, ensuring the originality is conventionally achieved by calculating a hash value from the coded-image data and by embedding an electronic watermark in the coded-image data. The hash value and the electronic watermark enable to judge whether the image data are tampered with or not in decoding the image data when even a part of the image data are tampered with.

Meanwhile, the stamps, the signs or the watermarks in the paper culture can be visually confirmed and it can be judged easily and immediately that the stamps, signs or watermarks, are not tampered with. However, when the electronic process in which the hash value and an electronic watermark are used is used, judgement cannot be easily achieved since a specific process, for example, operating a decoder is necessary to judge whether the image data are tampered with or not.

Also, in using the electronic watermark, if the algorithm for embedding the electronic watermark is analyzed, the electronic watermark might be embedded by using the algorithm after a randomly chosen image data are tampered with. Since image data with an electronic watermark embedded ensure that the image data are not tampered with, the art of electronic watermark makes it all the more difficult to detect that the image data are not tampered with.

SUMMARY OF THE INVENTION

The present invention has been achieved in views of aforementioned problems possessed by the conventional method for preventing the image data from being tampered with, and an object of the present invention is to provide a novel and improved image transmission device and image display device capable of preventing easily the image data from being tampered with and of confirming the originality of the image data visually.

To achieve the above object in the present invention, there is provided an image transmission device transmitting: a first coded-image data with a first image coded; and a second coded-image data with a coded second image, which is displayed over the first image and changes the form in the case of the first coded-image data tampered with.

The image transmission device can comprise: first image coding means for coding the first image; hash value operation means for calculating the hash value of the first image; second image coding means for coding the second image; encryption means for encrypting the second coded-image data by using the hash value of the first image as a key; and transmission means for transmitting the first coded-image data and the encrypted second coded-image data.

Also in the present invention, there is provided a storage medium wherein the program for realizing the function of the image transmission device is stored.

Further in the present invention, there is provided an image display device displaying in piles: a first image which is achieved by decoding the first coded-image data; and a second image which is achieved by decoding the second coded-image data and changes the form in the case of the first coded-image data tampered with.

The image display device can comprise: data acquisition means for acquiring the first coded-image data and the encrypted second coded-image data; first image decoding means for decoding the first coded-image data; hash value operation means for calculating the hash value of the decoded first image; decryption means for decrypting the encrypted second coded-image data by using the hash value of the first image as a key; second image decoding means for decoding the decrypted second coded-image data; and image combination means for combining the decoded first image with the decoded second image.

Also in the present invention, there is provided a storage medium wherein the program for realizing the function of the image display device is stored.

Further in the present invention, there is provided an image transmission/reception system comprising the image transmission device and the image display device, between which the first image and the second image are transmitted/ received.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENT

Figure 1:
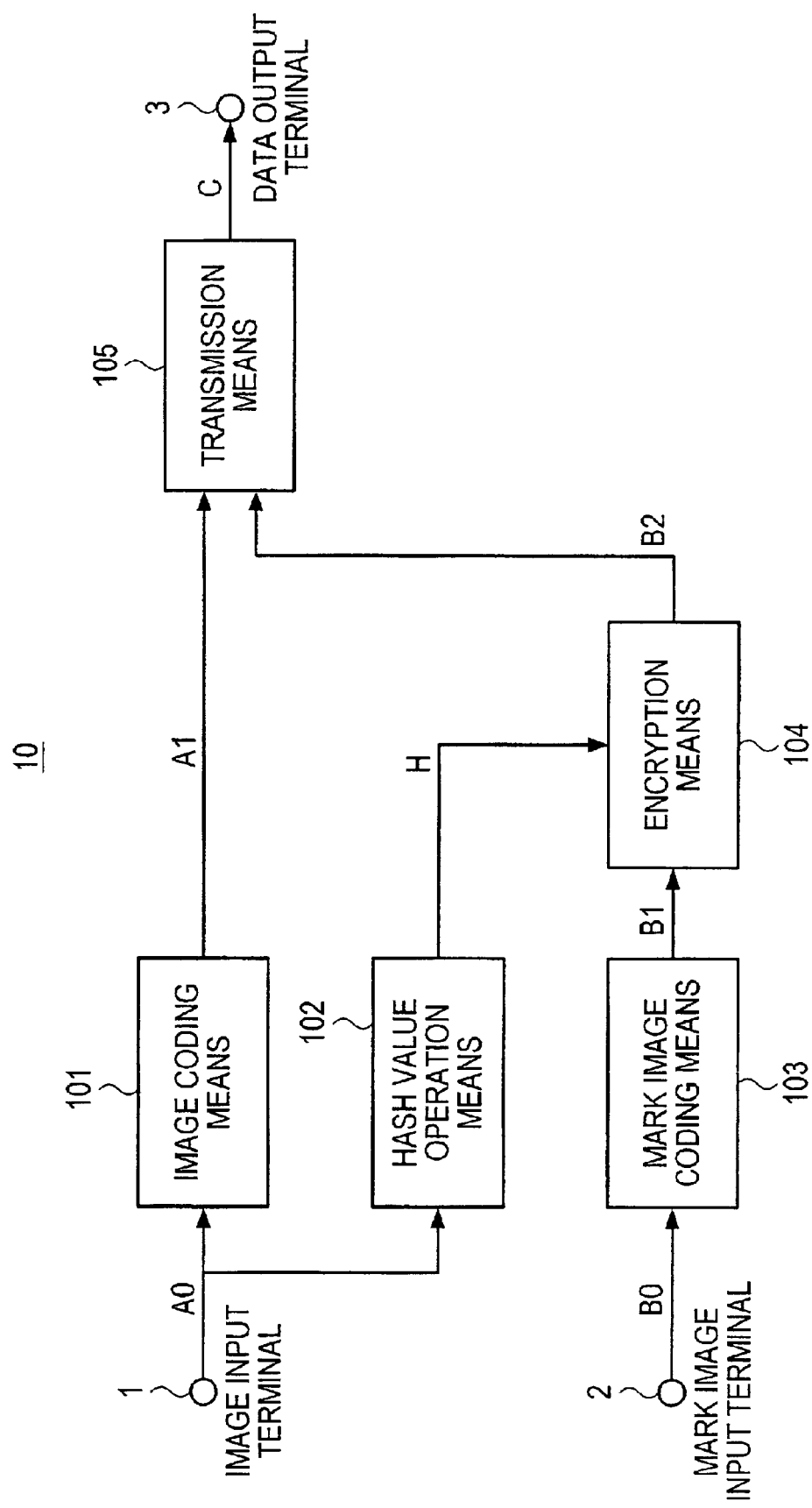
FIG. 1 is a chart illustrating an embodiment of an image transmission device.

Hereinafter, the preferred embodiment of the present invention will be described in reference to the accompanying drawings. Same reference numerals are attached to components having same functions in following description and the accompanying drawings, and a description thereof is omitted. In addition, a mark image means marks, stamps, or signs which are used to ensure that the image (coded-image data) are not tampered with.

In the embodiment, there is provided an image transmission device transmitting: a coded-image data with an image coded; and a coded-image data with a coded mark image, which is displayed over the image and changes the form in the case of the image data tampered with. An embodiment of the image transmission device will be described in reference to FIG. 1.

(Image Transmission Device 10)

The image transmission device comprises: image coding means 101 for coding an image A0; hash value operation means 102 for calculating the hash value H of the image A0; mark image coding means 103 for coding a mark image B0; encryption means 104 for encrypting mark coded-image data B1 by using the hash value H of the image A0 as a key; and transmission means 105 for multiplexing and transmitting coded-image data A1 and the encrypted mark coded-image data B2, as shown in FIG. 1.

The image coding means 101 is means for coding an image A0 input from an image input terminal 1. Such international standards for coding multi/bi-level still images as JPEG (Joint Photographic Coding Experts Group) and JBIG (Joint Bi-level Image Coding Experts Group) are used as a coding hereon. The input of the image A0 from the image input terminal 1 may be achieved through a network or by reading from such a storage medium as CD-ROM (Compact Disk Read Only Memory) and DVD (Digital Video Disk).

The hash value operation means 102 is means for calculating the input hash value H of the image A0. Such algorithms as MD5 (Message Digest 5) and DSA (Digital Signature Algorithm) are used as a hash value operation hereon.

The mark image coding means 103 is means for coding an image B0 input from a mark image input terminal 2. Such international standards for coding multi/bi-level still images as JPEG and JBIG are used as a coding hereon, as used on the image coding means 101. Alternatively, the image A0 and the mark image B0 may be coded concurrently by only one image coding mean comprised in the image transmission device 10. The input of the image B0 from the mark image input terminal 2 may be achieved through a network or by reading from such storage media as CD-ROM and DVD.

The encryption means 104 is means for encrypting the mark coded-image data B1, which are coded by the mark image coding means 103, by using the hash value H calculated in the hash value operation means 102 as a key. Such symmetric key cryptographs as DES (Data Encryption Standard) and Triple DES are used as an encryption hereon.

The transmission means 105 is means for multiplexing the coded-image data A1 which are achieved by the image coding means 101 and the encrypted mark coded-image data B2 which are achieved by the mark image coding means 103, and for transmitting as multiplexed coded-image data C. There are such means for multiplexing hereon as multiplexing as image data in different area, for example, JBIG2, and for storing in a comment area as binary data. The output of the multiplexed coded-image data C from a data output terminal C may be achieved through a network or by writing in such storage media as CD-ROM and DVD.

In the embodiment, although an explanation as to the case of the transmission means 105 with a function of multiplexing and transmitting data will be provided, the function of multiplexing data are not necessarily essential. The coded-image data A1 and the encrypted mark coded-image data B2 may be transmitted as separate data each.

The image transmission device 10 can be realized in software as well as hardware, each of which has the function of the image transmission device as a specific function. In other words, especially in the case of the software, the function of the image transmission device 10 can be realized by reading from the storage medium with the program for realizing the function of the image transmission device 10 into a computer terminal in general use.

Figure 2:
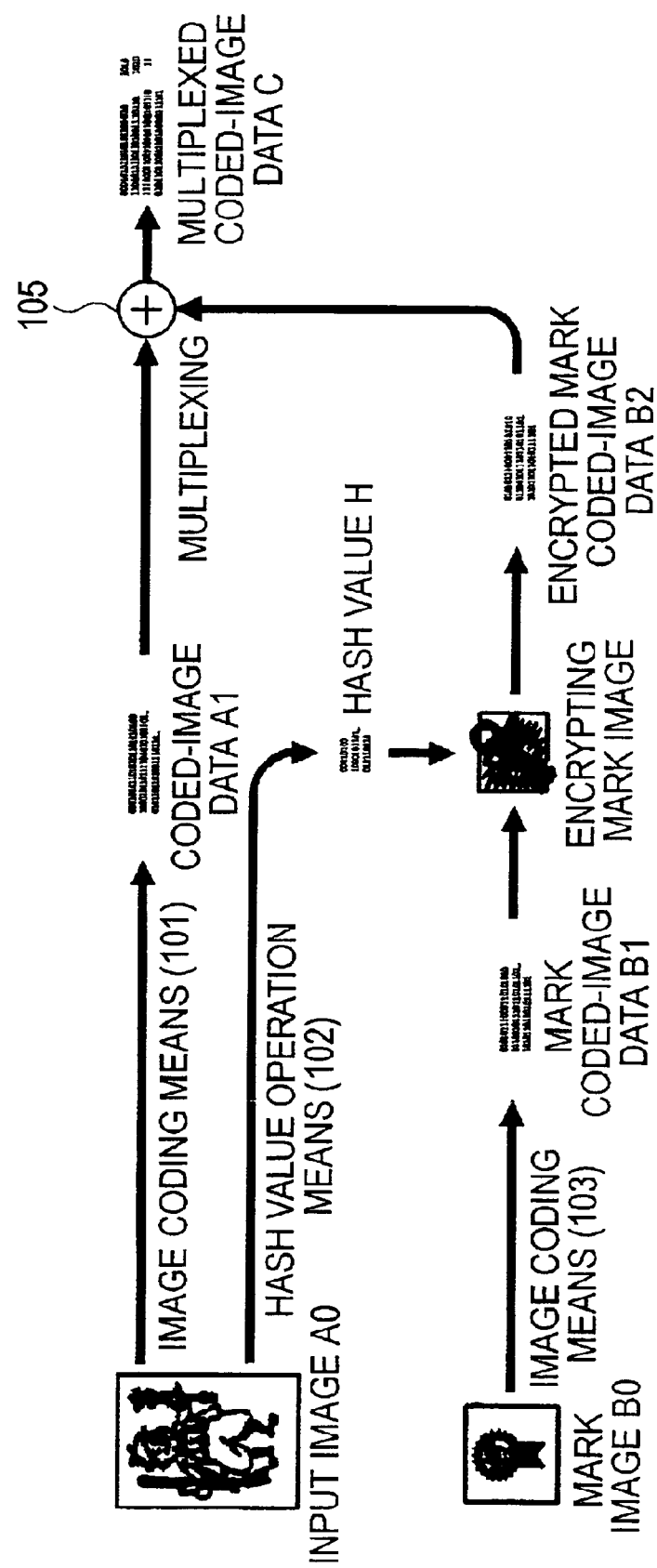
FIG. 2 is a chart illustrating a transition of data on the image transmission device shown in FIG. 1.

Next, an action of the image transmission device 10 will be described in view of a data transition in reference to FIG. 2.

The image A0 input from the image input terminal 1 is coded by the image coding means 101 while the hash value H is calculated in the hash value operation means 102. On the other hand, the mark image B0 input from the mark image input terminal 2 is coded by the mark image coding means 103.

The mark coded-image data B1, which are coded by the mark image coding means 103, are encrypted by using the hash value H calculated in the hash value operation means 102 as a key.

The coded-image data A1 and the encrypted mark coded-image data B2 are multiplexed by the transmission means 105 and are output from a data output terminal 3 as multiplexed coded-image data C.

Figure 3:
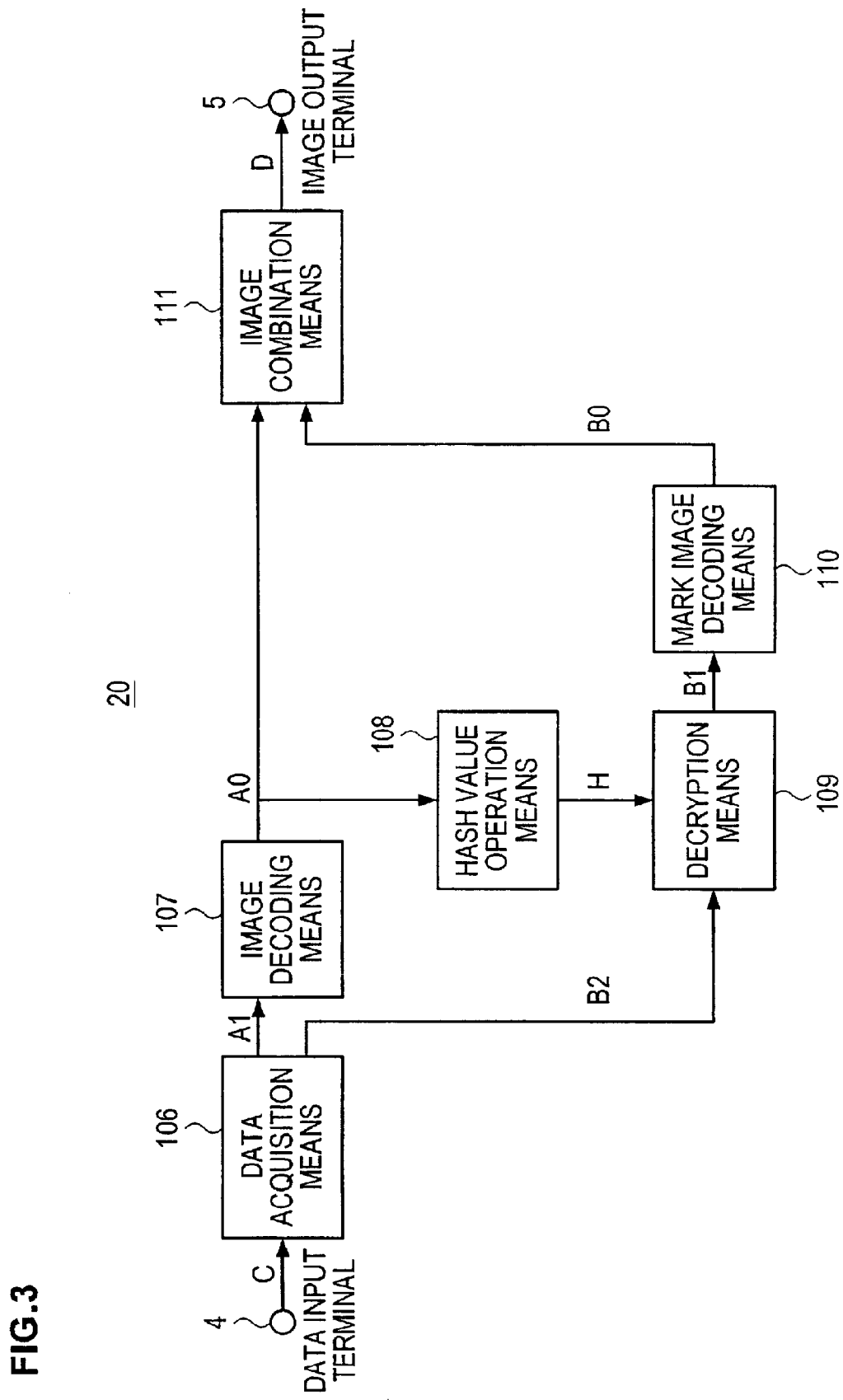
FIG. 3 is a chart illustrating an embodiment of an image display device.

In the embodiment, there is provided an image display device displaying in piles: an image which is achieved by decoding coded-image data; and a mark image which is achieved by decoding mark coded-image data and changes the form in the case of the coded-image data tampered with. An embodiment of the image transmission device will be described in reference to FIG. 3. Also, the embodiment will be described on the assumption that the image display device 20 receives the multiplexed coded-image data C transmitted from the image transmission device 10.

(Image Display Device 20)

The image display device 20 comprises: data acquisition means 106 for receiving the multiplexed coded-image data C transmitted from the image transmission device 10 and for dividing the multiplexed coded-image data C into the coded-image data A1 and the encrypted mark coded-image data B2; image decoding means 107 for decoding the coded-image data A1; hash value operation means 108 for calculating the hash value H of the decoded image A0; decryption means 109 for decrypting the encrypted mark coded-image data B2 by using the hash value H of the image A0 as a key; mark image decoding means 110 for decoding the decrypted mark coded-image data B1; and image combination means 111 for combining the decoded image A0 with the decoded mark image B0.

The data acquisition means 106 is means for receiving the multiplexed coded-image data C transmitted from the data output terminal 3 of the image transmission device 10 and for dividing the multiplexed coded-image data C into the coded-image data A1 and the encrypted mark coded-image data B2. In the embodiment, although an explanation as to the case of the image display device 20 with a function of receiving and dividing the multiplexed coded-image data C will be provided, the function of dividing the multiplexed coded-image data are not necessarily essential in the data acquisition means 106 when the coded-image data A1 and the encrypted mark coded-image data B2 are transmitted as separate data each. The input of the multiplexed coded-image data C from the data input terminal 4 may be achieved through a network or by reading from such storage media as CD-ROM and DVD.

The image decoding means 107 is means for decoding the coded-image data A1. Decoding hereon is assumed to be the function corresponding to that of the image coding means 101 in the image transmission device 10, and the image A0 is achieved by decoding the coded-image data A1.

The hash value operation means 108 is means for calculating the hash value H of the image A0 achieved by the image decoding means 107. Such algorithms as MD5 and DSA are used as a hash value operation hereon as in the hash value operation means 102.

The decryption means 109 is means for decrypting the mark coded-image data B2, which are encrypted by the data acquisition means 106, by using the hash value H calculated in the hash value operation means 108 as a key. Decryption hereon is assumed to be the function corresponding to that of the encryption means 101 in the image transmission device 10, and the coded-image data B1 are achieved by decrypting the encrypted mark coded-image data B2.

The mark image decoding means 110 is means for decoding the mark coded-image data B1 achieved by the decryption means 109. Decoding hereon is assumed to be the function corresponding to that of the mark image coding means 103 in the image transmission device 10, and the mark image B0 is achieved by decoding the mark coded-image data B1.

The image combination means 111 is means for combining the image A0 which is decoded by the image decoding means 107 with the mark image B0 which is decoded by the mark image decoding means 110. Such means as AND operation, OR operation, addition and replacement are used as combination means hereon. An image D with the combination of the image A0 and the mark image B0 is output from an image output terminal 5, and is displayed or printed out to be visually confirmed.

The image display device 20 can be realized in software as well as hardware, each of which has the function of the image display device as a specific function. In other words, especially in the case of the software, the function of the image display device 20 can be realized by reading from the storage medium with the program for realizing the function of the image display device 20 into a computer terminal in general use.

Next, an action of the image display device 20 will be described in view of a data transition in reference to FIG. 4.

The multiplexed coded-image data C are received by the data acquisition means 106 with the function of dividing the multiplexed coded-image data, and are divided into the coded-image data A1 and the encrypted mark coded-image data B2.

The coded-image data A1 are decoded by the image decoding means 107. The hash value H of the decoded image A0 is calculated by the hash value operation means 108.

The encrypted mark coded-image data B2 are decrypted by using the hash value H of the image A0 as a key, and the decrypted mark coded-image data B1 are decoded by the mark image decoding means 110.

The image A0 which is decoded by the image decoding means 107 and the mark image B0 which is decoded by the mark image decoding means 110 are combined (overlaid or multilaid) by the image combination means 111. The image D with the combination of the image A0 and the mark image B0 is output from the image output terminal 5.

Figure 4:
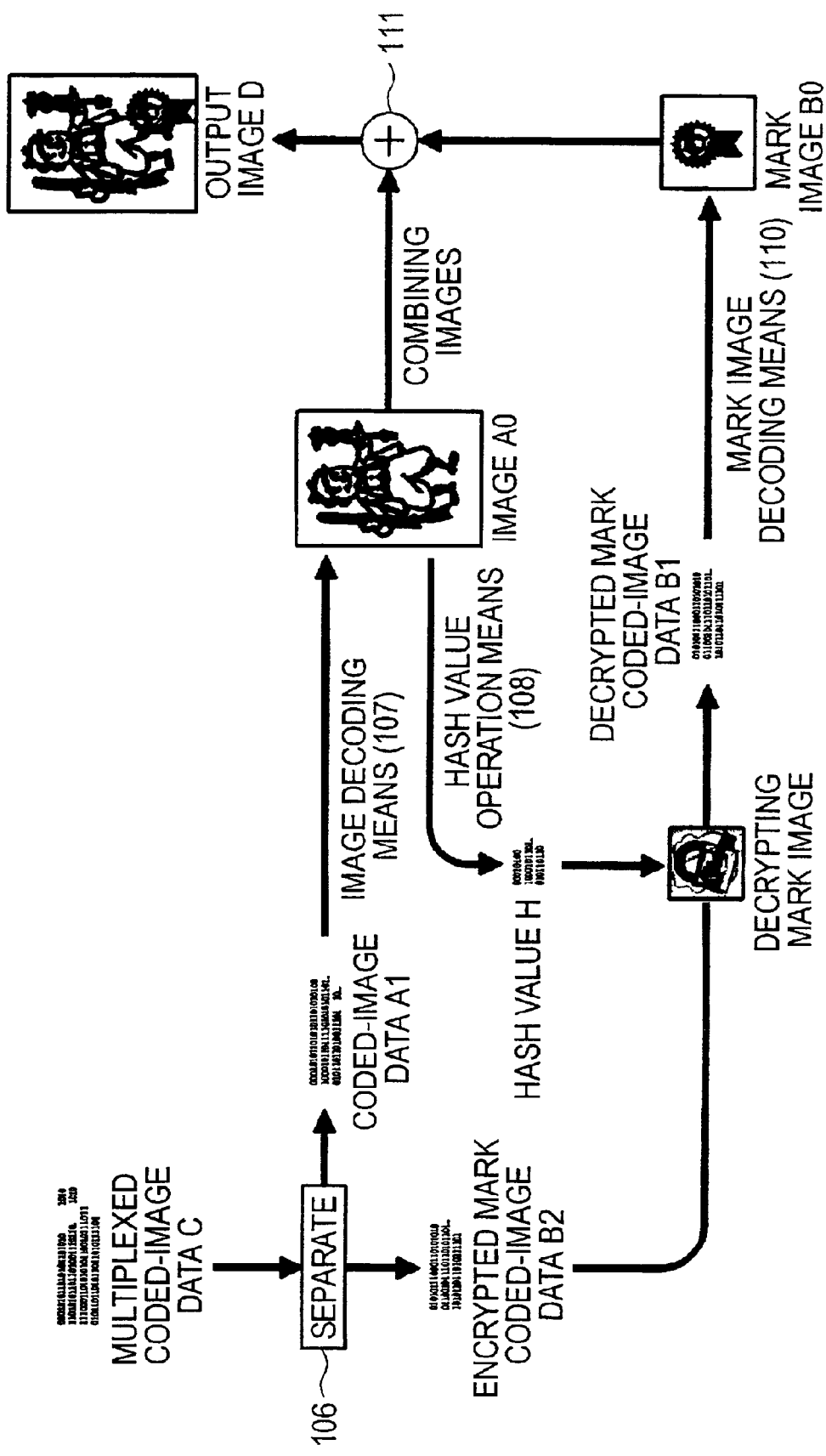
FIG. 4 is a chart illustrating a transition of data on the image display device shown in FIG. 3.

In FIG. 4, since the image A0 is not tampered with and the hash value is correct, a proper mark image is displayed on the output image D. When even a part of the image A0 is tampered with, a hash value H' which is different from the hash value H is calculated by the hash value operation means 108, according to the nature of hash value operation. Since the mark image, which is decrypted by using the hash value H' as a key and decoded, becomes a different image (noise) from the proper mark image B0 or cannot be decoded properly, the mark image cannot be acquired. After this manner, the originality of the image data can be confirmed visually and easily.

According to the image transmission device 10 and the image display device 20 as described in the embodiment, when even a part of the image is tampered with, a hash value H' of the image which is tampered with becomes different from the hash value H which is not tampered with. In other words, when even a part of the image is tampered with, the coded-image data of the mark image which is decrypted by using the hash value as a key become different from the coded-image data of the mark image which is not tampered with. Consequently, the mark image finally achieved enables to judge visually and easily whether the image data are tampered with or not.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

In the present invention as described above, the image data can be prevented easily from being tampered with and the originality of the image data can be confirmed visually.

What is claimed is:

1. An image transmission device transmitting first coded-image data with a coded first image, and second coded-image data with a coded second image with a predetermined form, which is displayed over the first image, the second image having a changed form when displayed in the case of the first coded-image data being tampered with, thereby to visually evidence the tampering, the device comprising:

first image coding means for coding the first image;

hash value operation means for calculating a hash value of the first image;

second image coding means for coding the second image;

encryption means for encrypting the second coded-image data by using the hash value of the first image as a key; and transmission means for transmitting the first coded-image data and the encrypted second coded-image data.

2. An image transmission device according to claim 1, wherein the transmission means comprise multiplexing means for multiplexing the first coded-image data and the encrypted second coded-image data.

3. An image transmission device according to claim 1, wherein the second image includes an image selected from the group of images consisting of marks, stamps, and signs, which are used to ensure that the coded-image data of the first image are not tampered with.

4. A computer readable medium wherein the program for realizing a function of the image transmission device according to claim 1 is stored.

5. An image transmission/reception system comprising an image transmission device according to claim 1 and an image display device, between which the coded first image and the coded second image are transmitted/received, the image display device displaying in layers a first decoded image which is achieved by decoding the first coded-image data and a second decoded image, which is achieved by decoding the second coded-image data, the second decoded image changing form in the case of the first coded-image data being tampered with, thereby visually to evidence the tampering.

6. An image display device displaying in layers a first image, which is achieved by decoding first coded-image data, and decoding a second image, which is achieved by decoding second coded-image data, the second image changing form in the case of the first coded-image data being tampered with, thereby to visually evidence the tampering, the device comprising:

data acquisition means for acquiring the first coded-image data and the encrypted second coded-image data;

first image decoding means for decoding the first coded-image data;

hash value operation means for calculating the hash value of the decoded first image;

decryption means for decrypting the encrypted second coded-image data by using the hash value of the first image as a key;

second image decoding means for decoding the decrypted second coded-image data; and image combination means for combining the decoded first image with the decoded second image.

7. An image display device according to claim 6, wherein the first image data and the second image data are acquired by receiving from outside of an image transmission device.

8. An image display device according to claim 6, wherein the first image data and the second image data are acquired by reading from storage media.

9. An image display device according to claim 6, wherein the data acquisition means comprise multiplexing and dividing means for dividing the multiplexed data in the case of the first coded-image data and the encrypted second coded-image data multiplexed.

10. An image display device according to claim 6, wherein the second image includes an image selected from the group of images consisting of marks, stamps, or signs, which are used to ensure that the coded-image data of the first image are not tampered with.

11. A computer readable medium wherein a program for realizing a function of image display device according to claim 6 is stored.

12. An image transmission/reception system comprising:

an image transmission device transmitting:

first coded-image, data with a coded first image, and second coded-image data with a coded second image with a predetermined form, which is displayed over the first image, the second image having a changed form when displayed in the case of the first coded-image data being tampered with, thereby visually to evidence the tampering; and an image display device according to claim 6, between which the first image and the second image are transmitted/received.

* * * * *